(12) United States Patent
Tran et al.

(10) Patent No.: US 11,569,985 B2
(45) Date of Patent: Jan. 31, 2023

(54) PRESERVING INTER-PARTY DATA PRIVACY IN GLOBAL DATA RELATIONSHIPS

(71) Applicant: International Business Machines Corporation, Armonk, NY (US)

(72) Inventors: Ngoc Minh Tran, Dublin (IE); Mathieu Sinn, Dublin (IE); Stefano Braghin, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/362,143

(22) Filed: Jun. 29, 2021

(65) Prior Publication Data
US 2022/0417009 A1  Dec. 29, 2022

(51) Int. Cl.
*H04L 9/32* (2006.01)
*H04L 9/08* (2006.01)
*H04L 9/00* (2022.01)
*G06F 16/28* (2019.01)
*H04L 9/14* (2006.01)

(52) U.S. Cl.
CPC .......... *H04L 9/0825* (2013.01); *G06F 16/288* (2019.01); *H04L 9/008* (2013.01); *H04L 9/14* (2013.01); *H04L 2209/08* (2013.01)

(58) Field of Classification Search
CPC .......... H04L 9/0825; H04L 9/008; H04L 9/14
(Continued)

(56) References Cited

U.S. PATENT DOCUMENTS 7,562,071 B2   7/2009  Dwork
7,853,545 B2  12/2010  Chang
(Continued)

FOREIGN PATENT DOCUMENTS

CN     110134879 A    8/2019

OTHER PUBLICATIONS

Arita, et al., "Fully Homomorphic Encryption for Point Numbers", Apr. 22,2016,20 pgs., Graduate School of Information Security, Institute of Information Security, Japan.
(Continued)

*Primary Examiner* — Jeffrey C Pwu
*Assistant Examiner* — Samuel Ambaye
(74) *Attorney, Agent, or Firm* — Joseph P. Curcuru

(57) ABSTRACT

Disclosed are techniques for determining data relationships between privacy-restricted datapoints, sourced over a computer network, which require data privacy measures concealing at least some datapoints from other clients in the network that the datapoint respectively do not originate from. A first client encrypts a first datapoint with a public key of a public/private encryption scheme and communicates it to the second client along with the public key. The second client encrypts a corresponding second datapoint with the public key, then determines a relationship between the two encrypted datapoints, and communicates the determined relationship to a central client along with the public key. Random noise is encrypted by the central client and added to the determined relationship, then sent together to the first client, followed by decryption by the first client using the private key. The central client extracts the random noise after receiving the decrypted determined relationship.

18 Claims, 9 Drawing Sheets

(58) Field of Classification Search
USPC .......................................................... 713/168
See application file for complete search history.

(56) References Cited

U.S. PATENT DOCUMENTS

| | | | |
|---|---|---|---|
| 8,281,121 B2 | 10/2012 | Nath | |
| 8,619,984 B2 | 12/2013 | McSherry | |
| 10,146,958 B2 | 12/2018 | Wang | |
| 2011/0176677 A1* | 7/2011 | Furukawa | H04L 9/3218 380/255 |
| 2014/0196151 A1 | 7/2014 | Mishra | |
| 2015/0143112 A1* | 5/2015 | Yavuz | G06F 21/6227 713/165 |
| 2016/0140348 A1* | 5/2016 | Nawaz | G06F 21/602 726/26 |
| 2018/0373882 A1 | 12/2018 | Veugen | |
| 2020/0356558 A1 | 11/2020 | Nerurkar | |

OTHER PUBLICATIONS

Gentry, "A Fully Homomorphic Encryption Scheme", Dissertation submitted to the Department of Computer Science and the Committee on Graduate Studies of Stanford University, Sep. 2009, 209 pgs.

Gleim, et al., "Schema Extraction for Privacy Preserving Processing of Sensitive Data", CEUR Workshop Proceedings, 2018, 12 pgs., Germany, <http://ceur-ws.org/Vol-2112/sewebmeda_paper_1.pdf>.

Kumar, et al., "Survey on Privacy Preserving Data Mining for Information Extraction", International Conference on Intelligent Computing and Sustainable System (ICICSS 2018), Jul. 2019, 5 pgs., © 2018 IEEE, <https://www.researchgate.net/publication/334537259>.

Lopez-Alt, et al., "On-the-Fly Multiparty Computation on the Cloud via Multikey Fully Homomorphic Encryption", STOC '12: Proceedings of the forty-fourth annual ACM Symposium on Theory of Computing, May 2012. 73 pgs., <https://doi.org/10.1145/2213977.2214086>.

Sanil, et al., "Privacy Preserving Regression Modelling Via Distributed Computation", KDD '04: Proceedings of the Tenth ACM SIGKDD International Conference on Knowledge Discovery and Data Mining, Aug. 2004, 6 pgs., <https://doi.org/10.1145/1014052.1014139>.

Wong, et al., "Privacy Preserving Similarity Coefficients for Binary Data", Computers & Mathematics with Applications, vol. 65, Issue 9, May 2013, 24 pgs., <https://doi.org/10.1016/j.camwa.2012.02.028>.

* cited by examiner

PRESERVING INTER-PARTY DATA PRIVACY IN GLOBAL DATA RELATIONSHIPS

BACKGROUND

The present invention relates generally to the field of electronic information privacy, and more particularly to sharing data relationships while preserving privacy of the underlying data.

In cryptography, encryption describes the process of encoding information. This process transforms the original representation of the information, known sometimes as plaintext, into an alternative form known as ciphertext. Ideally, only authorized parties are able to decipher a ciphertext back to plaintext and access the original information. Encryption does not itself prevent interference in communication of the encrypted content but denies the intelligible content to a would-be interceptor. For technical reasons, an encryption scheme typically leverages a pseudo-random encryption key generated by an algorithm. While it is theoretically possible to decrypt the message without possessing the key, for a well-designed encryption scheme, considerable computational resources and skills are required to do so.

Public-key cryptography, or asymmetric cryptography, concerns a cryptographic system that uses pairs of keys: (i) public keys (which may be known to others), and (ii) private keys (which may never be known by any except the owner). The generation of such key pairs typically depends upon cryptographic algorithms which are based on mathematical problems termed one-way functions. Effective security depends on keeping the private key private; the public key may be openly distributed without compromising security of information encrypted with the public key. In such a system, any entity can encrypt a piece of information using the intended receiver's public key, but that encrypted piece of information can only be decrypted with the receiver's private key.

Homomorphic encryption is a sub-type of encryption that permits users to perform computations on its encrypted data without first decrypting it. These resulting computations remain in an encrypted form which, when decrypted, yield an identical output to that produced had the computations been performed on the unencrypted data. Homomorphic encryption can be utilized for privacy-preserving outsourced data storage and computation. This enables data to be encrypted and out-sourced or communicated to third party commercial cloud environments for processing, all while remaining encrypted.

SUMMARY

According to an aspect of the present invention, there is a method, computer program product and/or system for use with at least two datasets, including a first dataset and a second dataset, respectively controlled by a first data party and a second data party that performs the following operations (not necessarily in the following order): (i) receiving a public key of a public-private key pair from the first data party corresponding to the public key used by the first data party to encrypt the first dataset and the second party to encrypt the second dataset; (ii) receiving an encrypted relationship function output value corresponding to a relationship between the first dataset encrypted with the public key and the second dataset encrypted with the public key; and (iii) generating a noisy encrypted relationship function output value by supplementing the encrypted relationship function output value with a random noise value encrypted with the public key.

DETAILED DESCRIPTION

Figure 1:
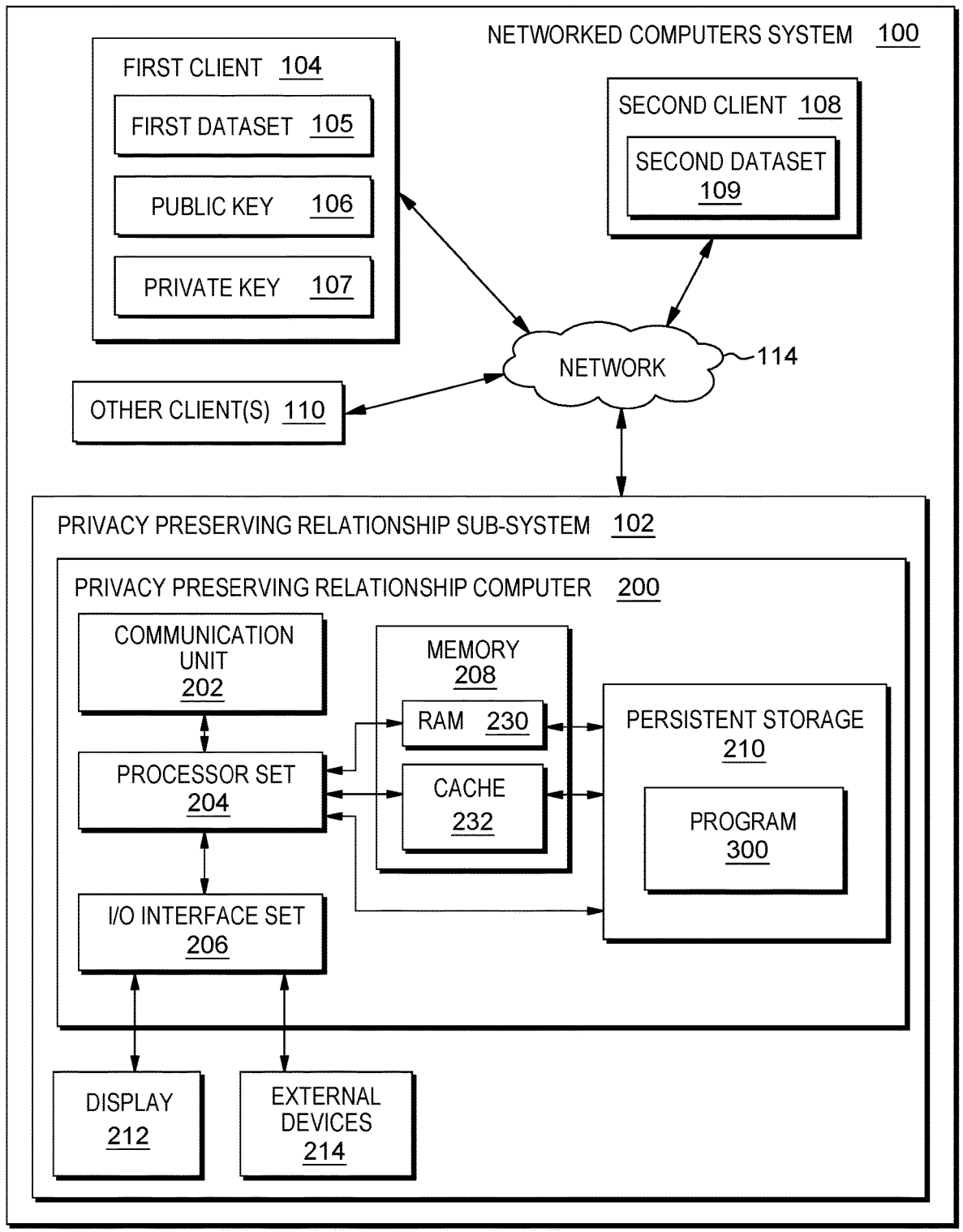
FIG. 1 is a block diagram view of a first embodiment of a system according to the present invention.

Some embodiments of the present invention are directed to techniques for determining data relationships between privacy-restricted datapoints, sourced over a computer network, which require data privacy measures concealing at least some datapoints from other clients in the network that the datapoint respectively do not originate from. A first client encrypts a first datapoint with a public key of a public/private encryption scheme and communicates it to the second client along with the public key. The second client encrypts a corresponding second datapoint with the public key, then determines a relationship between the two encrypted datapoints, and communicates the determined relationship to a central client along with the public key. Random noise is encrypted by the central client and added to the determined relationship, then sent together to the first client, followed by decryption by the first client using the private key. The central client extracts the random noise after receiving the decrypted determined relationship.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium sometimes referred to as a machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: privacy preserving relationship subsystem 102 (sometimes herein referred to, more simply, as subsystem 102); first client sub-system 104 (or first client 104); second client subsystem 108 (or second client 108); other client(s) 110; and communication network 114. Privacy preserving relationship subsystem 102 includes: privacy preserving relationship subsystem computer 200; communication unit 202; processor set 204; input/output (I/O) interface set 206; memory 208; persistent storage 210; display 212; external device(s) 214; random access memory (RAM) 230; cache 232; and program 300. First client 104 includes: first dataset 105; public key 106; and private key 107. Second client 108 includes second dataset 109.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device(s) 214. External device(s) 214 will typically include devices such as a keyboard, keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

First client 104 may be a laptop computer, tablet computer, netbook computer, personal computer (PC), a desktop computer, a personal digital assistant (PDA), a smart phone, or any other type of computer (see definition of "computer" in Definitions section, below). First dataset 105 may be any kind of machine readable information or data, such as a database, data table, computer file, etc. Public key 106 is a public key of a public key/private key cryptographic key pair. Private key 107 is the private key of the public key/private key cryptographic key pair.

Second client 108 may be a laptop computer, tablet computer, netbook computer, personal computer (PC), a desktop computer, a personal digital assistant (PDA), a smart phone, or any other type of computer (see definition of "computer" in Definitions section, below). Second dataset 109 may be any kind of machine readable information or data, such as a database, data table, computer file, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
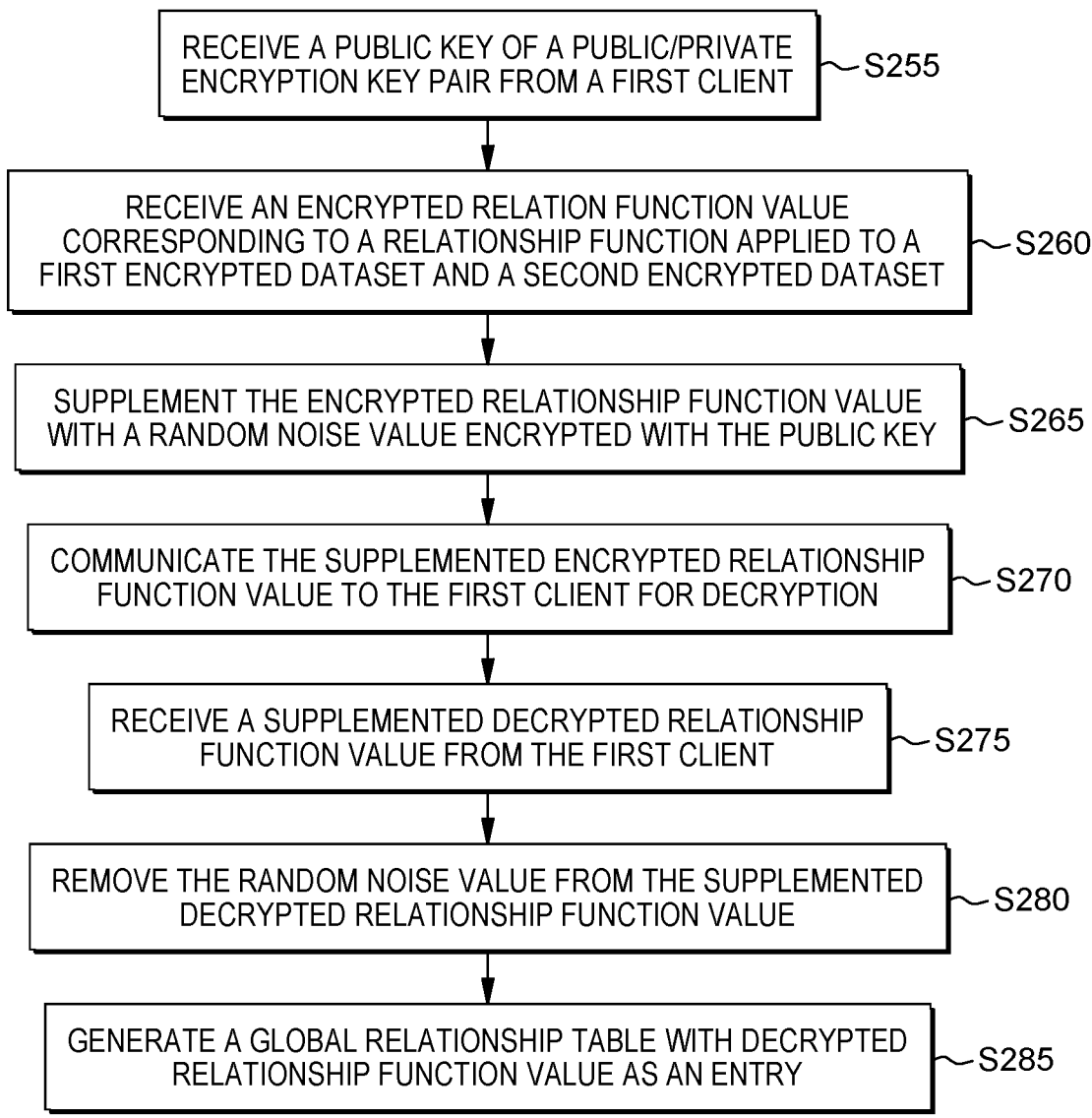
FIG. 2 is a flowchart showing a first embodiment method performed, at least in part, by the first embodiment system.
Figure 3:
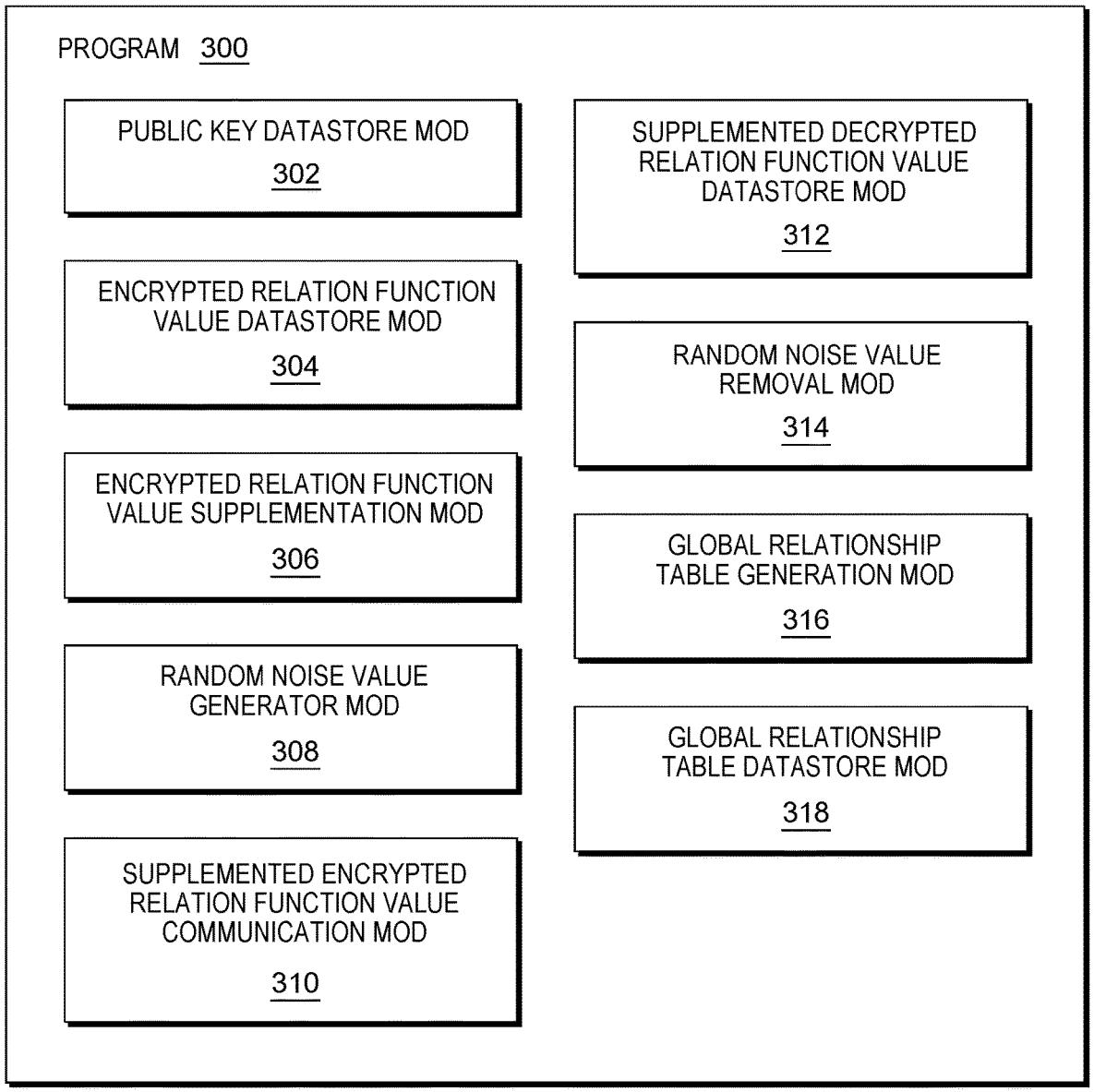
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where public key datastore module ("mod") 302 receives a public key of a public/private encryption key pair from a first client. In this simplified embodiment, the public key is generated by first client 104 of FIG. 1, shown as public key 106, as part of a public key/private key pair, alongside a corresponding private key, shown as private key 107. Private key 107 provides means to decrypt information encrypted by public key 106. Public key 106 is communicated to public key datastore mod 302 through network 114 and communicated to second client 108 through network 114. Private key 107 is held privately by first client 104 and not shared with either second client 108 or subsystem 102. Along with public key 106, first client 104 communicates to second client 108 a copy of first dataset 105 which has been encrypted using public key 106. First dataset 105 and second dataset 109 can be any type of machine readable information. For example, in this simplified embodiment, first dataset 105 can be a two dimensional vector of [1,5] and second dataset 109 can be a two dimensional vector of [2,9]. Other types of machine readable information are suitable to serve as the datasets, assuming both datasets are of appropriate formats to serve as inputs of a relationship function, discussed further below.

Processing proceeds to operation S260, where encrypted relation function value datastore mod 304 receives an encrypted relation function value corresponding to a relation function applied to a first encrypted dataset and a second encrypted dataset. In this simplified embodiment, a copy of first dataset 105 was previously encrypted by first client 104 with public key 106 and communicated to second client 108. Second client 108 encrypts a copy of second dataset 109 with public key 106, and generates a relationship function that uses the encrypted copy of first dataset 105 and the encrypted copy of second dataset 109 as inputs through homomorphic encryption, yielding the encrypted relation function value received from second client 108. By way of homomorphic encryption, the relationship function is performed on the encrypted copies of first dataset 105 and second dataset 109. The relationship function, in this example embodiment, is a Pearson function, which outputs a Pearson product moment correlation coefficient (or "Pearson product" in this disclosure). The Pearson correlation coefficient is a measure of linear correlation between two sets of data (first dataset 105 and second dataset 109, in this example), described as the covariance of the two variables, divided by the product of their standard deviations; essentially, it is a normalized measurement of the covariance, such that the result always has a value between −1 and 1. By this operation flowchart 250, first client 104 has not communicated an unencrypted copy of first dataset 105 to either second client 108 or subsystem 102, nor has second client 108 communicated an unencrypted copy of second dataset 109 to either first client 104 or subsystem 102.

Other example relationship functions that may be applied in this example embodiment include, but not limited to: (i) other correlation functions (Spearman, etc.), and (ii) similarity functions (cosine, Euclidian, etc.). In some alternative embodiments, the relationship function may be asymmetrical, where the output of such a function differs based on the order of inputs (for example, instead of first dataset 105, second dataset 109, the inputs are second dataset 109, first dataset 105). When the relationship function is asymmetrical, encrypted relation function value datastore mod 304 receives two encrypted relation function values, corresponding to each configuration of order of inputs of the relationship function of the underlying datasets.

Processing proceeds to operation S265, where encrypted relation function value supplementation mod 306 supplements the encrypted relation function value with a random noise value encrypted with the public key. In this simplified embodiment, encrypted relation function value supplementation mod 306 calls random noise value generator mod 308 to generate a random noise value (for future application to the encrypted relation function value), which is then encrypted by encrypted relation function value supplementation mod 306 with the public key stored in public key datastore mod 302 to create an encrypted random noise value. For example, a random noise value generated by random noise value generator mod 308 might be 0.42 prior to encryption. Encrypting the random noise value with public key 106 would transform the value of 0.42 into an encrypted state that is effectively unintelligible data unless decrypted with private key 107. Encrypted relation function value supplementation mod 306 then supplements the encrypted relation function value with the encrypted random noise value, resulting in a supplemented encrypted relation function value: an encrypted relationship function supplemented with an encrypted random noise value. This random noise value, in unencrypted form, is not shared with first client 104 and second client 108.

Processing proceeds to operation S270, where supplemented encrypted relation function value communication mod 310 communicates the supplemented encrypted relation function value to the first client for decryption. In this simplified embodiment, supplemented encrypted relation function value communication mod 310 communicates the supplemented encrypted relation function value through network 114 to first client 104 for decryption. While first client 104 has private key 107, providing first client 104 the capability to decrypt the encryption of the supplemented encrypted relation function value, first client 104 did not receive the random noise value nor second dataset 109 in isolation, but as part of an overall value that encompasses both the encrypted relation function value and the encrypted random noise value. The presence of the random noise value, in both encrypted and decrypted forms, obfuscates the relation function value from first client 104.

Processing proceeds to operation S275, where supplemented decrypted relation function value datastore mod 312 receives a supplemented decrypted relation function value from the first client. In this simplified embodiment, supplemented decrypted relation function value datastore mod 312 receives a supplemented decrypted relation function value from first client 104 through network 114. The supplemented decrypted relation function value is the result of first client 104 decrypting the supplemented encrypted relation function value with private key 107.

Processing proceeds to operation S280, where random noise value removal mod 314 removes the random noise value from the supplemented decrypted relation function value. In this simplified embodiment, random noise value removal mod 314 removes the random noise value from the supplemented decrypted relation function value stored in supplemented decrypted relation function value datastore mod 312, resulting in a decrypted relation function value corresponding to the decrypted result of the encrypted relation function value received at S260 excluding the random noise value that was supplemented (in an encrypted form) to the encrypted relation function value. As random noise value generator mod 308 is part of program 300 of subsystem 102, subsystem 102 has knowledge of the random noise value (0.42) previously applied to encrypted relation function value (which resulted in supplemented encrypted relation function value, later decrypted into supplemented decrypted relation function value), enabling random noise value removal mod 314 to reverse the application of the random noise value. In this simplified embodiment, reversing the application of the random noise value entails subtracting 0.42 from the supplemented decrypted relation function value stored in supplemented decrypted relation function value datastore mod 312.

Processing proceeds to operation S285, where global relationship table generation mod 316 generates a global relationship table with decrypted relation function value as an entry. In this simplified embodiment, the global relationship table is a table for querying Pearson products between pairs of datasets spread across a plurality of clients, such as first dataset 105 of first client 104 and second dataset 109 of second client 109. For the sake of simplicity, the decrypted relation function value is the first entry that populates the global relationship table. The global relationship table, once generated, is stored in global relationship datastore mod 318. Subsequent Pearson products corresponding to subsequent iterations of operations S255 through S280 applied to other pairs of datasets from any combination of: (i) first client 104, (ii) second client 108, and/or (iii) other client(s) 110 connected to subsystem 102 through network 114 and/or other computer networks), are used to populate other entries of the global relationship tables corresponding to the appropriate pairings.

III. Further Comments and/or Embodiments

Some embodiments of the present invention recognize the following facts, potential problems and/or potential areas for improvement with respect to the current state of the art: (i) A Privacy-Preserving Framework for Computing Data Relation in Federated Settings; (ii) data is often distributed across different departments within an organization or across different corporations; (iii) often, that data cannot cross boundaries because of legal obligations or internal governance, risk & compliance (GRC) controls; (iv) a global relationship between distributed data points is crucial and applicable in the following scenarios; (v) data analytics, where computing such a table/matrix is essential in any statistical data analytics for data understanding and visualization; (vi) data poisoning: in the context of federated learning, such a table/matrix helps to determine potential poisoned data to eliminate them out of the training process; (vii) data valuation: in the context of federated learning, such a table/matrix helps to value data contribution; (viii) therefore, there is a need in the field for tools to compute, in a precise and privacy preserving manner, relationships across datasets (constituting of tables) distributed among multiple entities.

Figure 4:
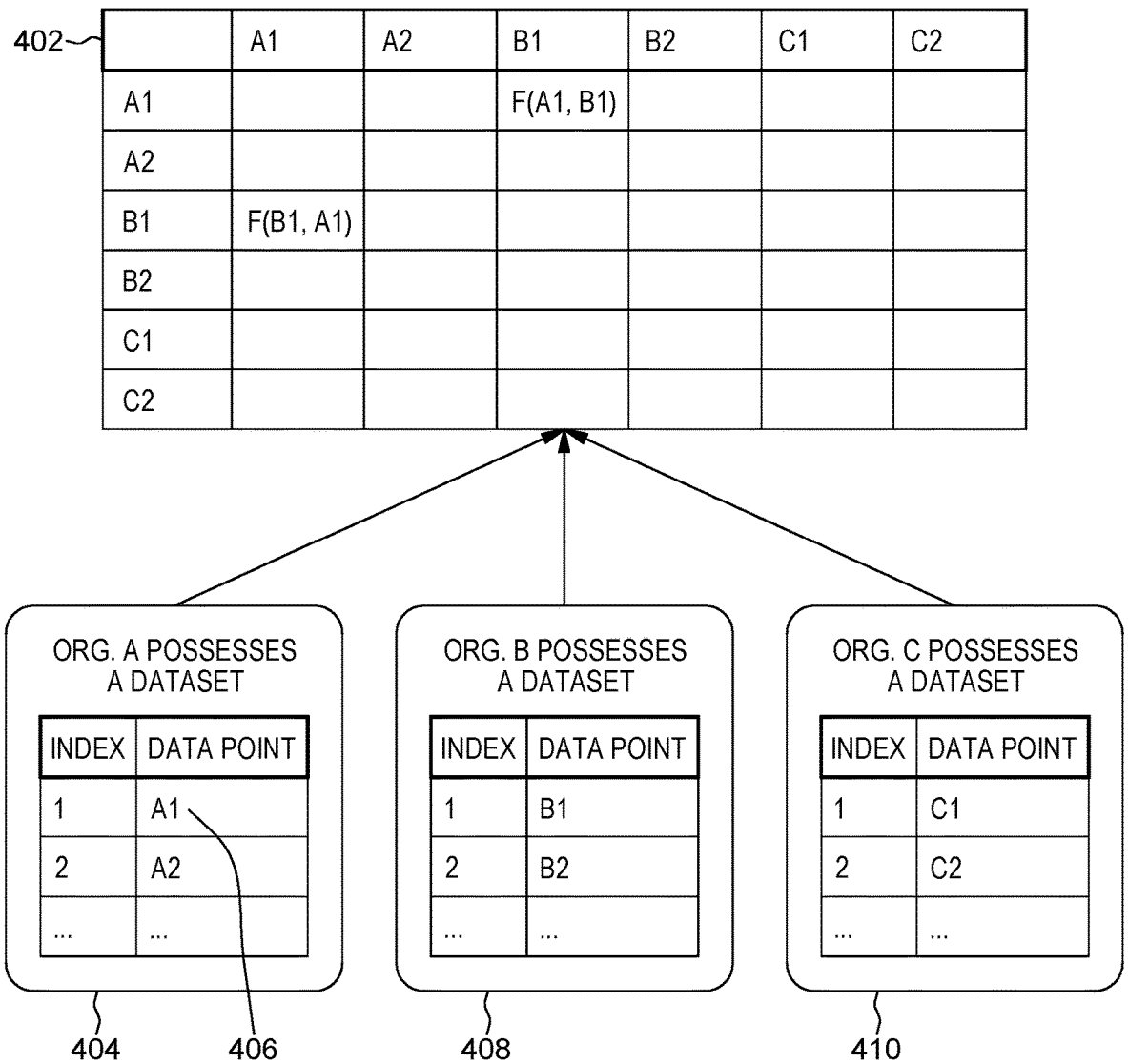
FIG. 4 is a block diagram view of a second embodiment of a system according to the present invention.

Diagram 400 of FIG. 4 shows a block diagram of a multi-organization data distribution according to an embodiment of the present invention, including: (i) global relationship table 402; (ii) organization A dataset 404; (iii) datapoint A1 406 of organization A dataset 404; (iv) organization B dataset 408; and (v) organization C dataset 410. Data is distributed across different organizations (such as organization A dataset 404 and organization b dataset 408) and cannot be shared explicitly due to privacy concerns, leading to a problem of how to compute global relationships between data points from different organizations. A data point is a numeric vector, e.g. datapoint A1 406 is equal to [2.5, 1.4, 2.3]. In this example, all data points globally have equal length. A relationship between two or more data points refers to any function F that is either symmetric or asymmetric. Examples of F include but not limited to correlation function, cosine similarity, covariance or any distance function, but generally refer to functions for the computation of similarity, correlation, and similar statistical properties. A global relationship refers to the illustrated table global relationship table 402.

Some embodiments of the present invention may include one, or more, of the following operations, features, characteristics and/or advantages: (i) an embodiment mechanism uses different techniques (FML-based) to provide exact instead of noisy results; (ii) allow to involve an untrusted party such as the central component in its computation; (iii) protects personal/private/proprietary information while still enabling creation of global relationships on distributed data without having to centralize it; (iv) provides exact results of the application of functions for the extraction of statistical properties (correlation, similarity etc.) of distributed, homogeneous, dataset; (v) contrary to other privacy preserving techniques like differential privacy; (vi) has applications in industry where data is often vertically distributed and privacy sensitive; (vii) potential applications in federated settings as well; (viii) applies in data analytics settings, including: (a) data understanding, (b) visualization; (ix) applies to data poisoning defense settings; and (x) useful for data value estimation.

Some embodiments of the present invention may include one, or more, of the following operations, features, characteristics and/or advantages: (i) compute data relations and supports federated settings; (ii) mechanism to compute exact results (no noise) and allowing the execution of more complex queries than what can be represented in a one round map-reduce fashion; (iii) namely, allowing the computation of data relations like, but are not limited to, field/dataset correlation and field/dataset similarity; (iv) compute data relations between data points distributed among parties; (v) furthermore, by sampling (which embodiments of the present invention avoid), it is not possible to compute a full and precise relation among distributed data points; and (vi) data relations, local and distributed, are computed in a federated settings.

Figure 5A:
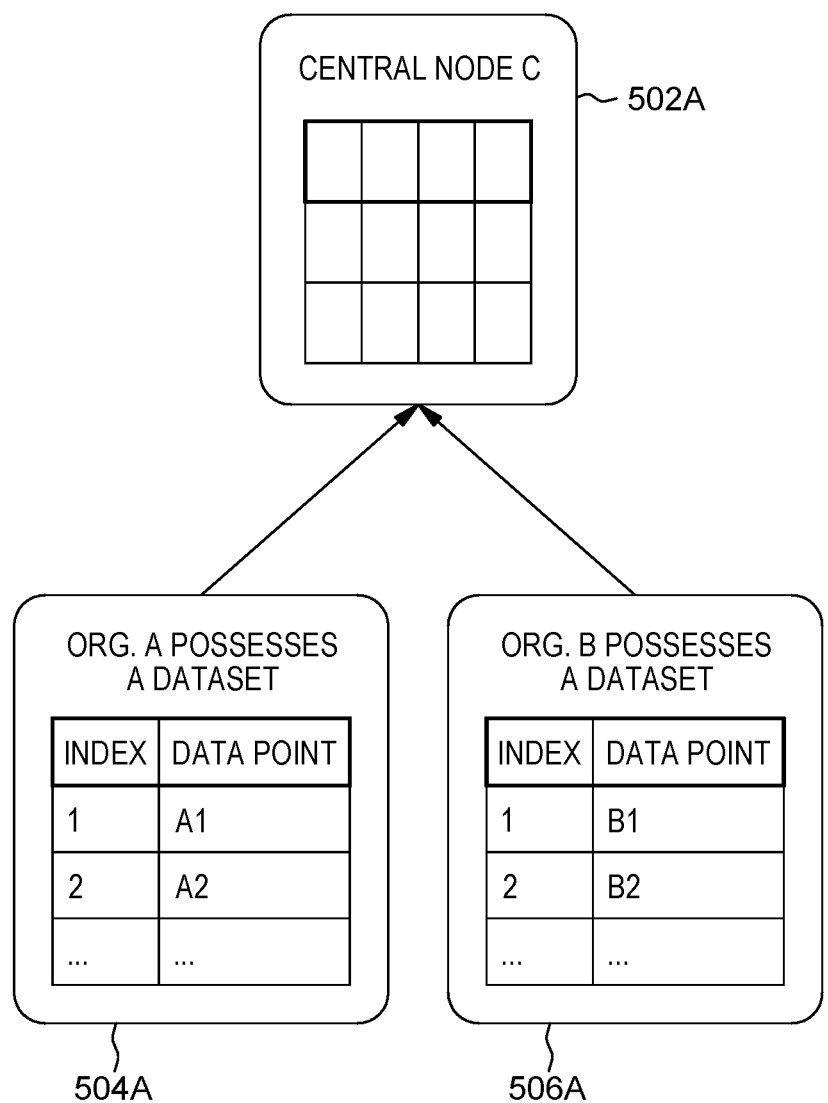
FIG. 5A is a block diagram view of a global distribution of data according to a second embodiment of the present invention.

Diagram 500A of FIG. 5A shows a block diagram of a multi-organization data distribution according to an embodiment of the present invention. Under the following privacy-restrictions, computing such a table/matrix (as shown in table 402 of FIG. 4) becomes challenging. Organization A dataset 504A will not exhibit its own data to any external party including organization B dataset 506A and central node C 502A (and other data owners), similarly for organization B dataset 506A (and other data owners). Only central node C 502A knows the table entries. Organization A dataset 504A and organization B dataset 506A are not allowed to know any table entry because Organization A dataset 504A and organization B dataset 506A can reverse-engineer data of other owners based on their respective data and table entries which contain relationship between their respective data and data of others.

Figure 5B:
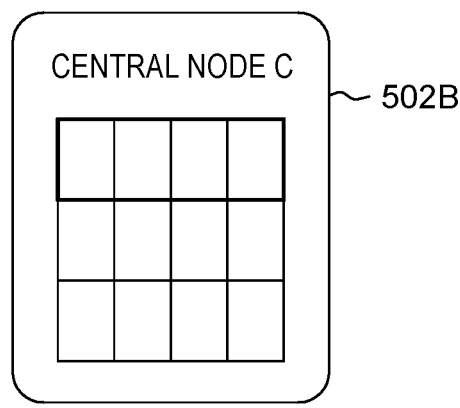
FIG. 5B is a block diagram view of a first stage of establishing privacy preserving global data relationships according to a second embodiment of the present invention.
Figure 5B:
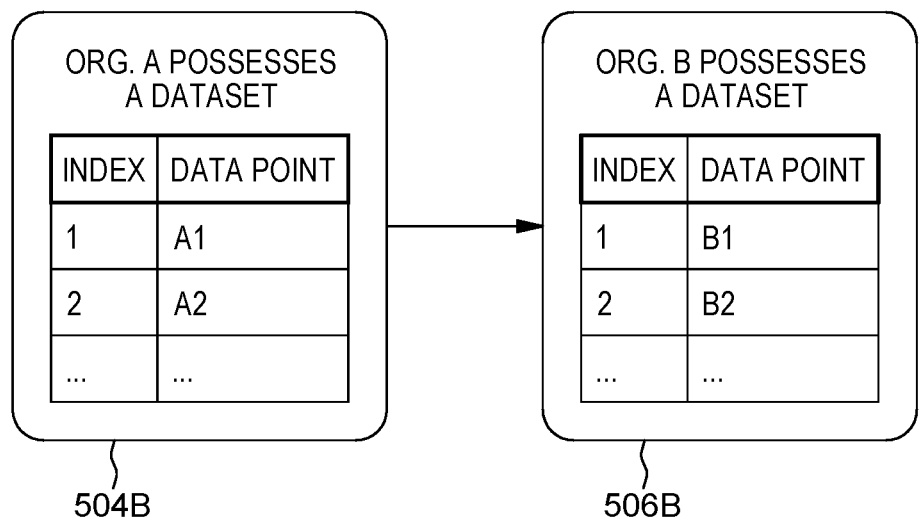

Diagram 500B of FIG. 5B shows a block diagram illustrating a first stage of establishing a global relation between datasets of a multi-organization data distribution while preserving data privacy between organizations (and/or data parties and/or entities) according to an embodiment of the present invention, including the following: (i) central node C 502B, a central node controlled by organization C; (ii) organization A dataset 504B, a dataset controlled by organization A; and (iii) organization B dataset 506B, a dataset controlled by organization B. At this stage, referred to as Stage_1(A, B), describes communication between organization A dataset 504B and organization B dataset 506B. Organization A, the controller of organization A dataset 504B, generates a pair of public and private keys (publicA, privateA) and sends the public key, publicA, to organization B and organization C. Organization A encrypts its own data from organization A dataset 504B (or "dataA") with the key, publicA, and sends the resulting encrypted dataset, dataA_publicA, to organization B of organization B dataset 506B. Organization B receives dataA_publicA from Organization A, and encrypts its own data from organization B dataset 506B (or "dataB") with publicA to get dataB_publicA. Note that Organization A does not communicate the private key, privateA, to either organizations B or C. Also note that organization B does not communicate the data, dataB, which it encrypted with the public key provided by organization A, publicA, to which organization A has the corresponding private key, privateA, which could be used to decode dataB_publicA. Organization B, lacking the key privateA, effectively cannot decrypt dataA_publicA.

Figure 5C:
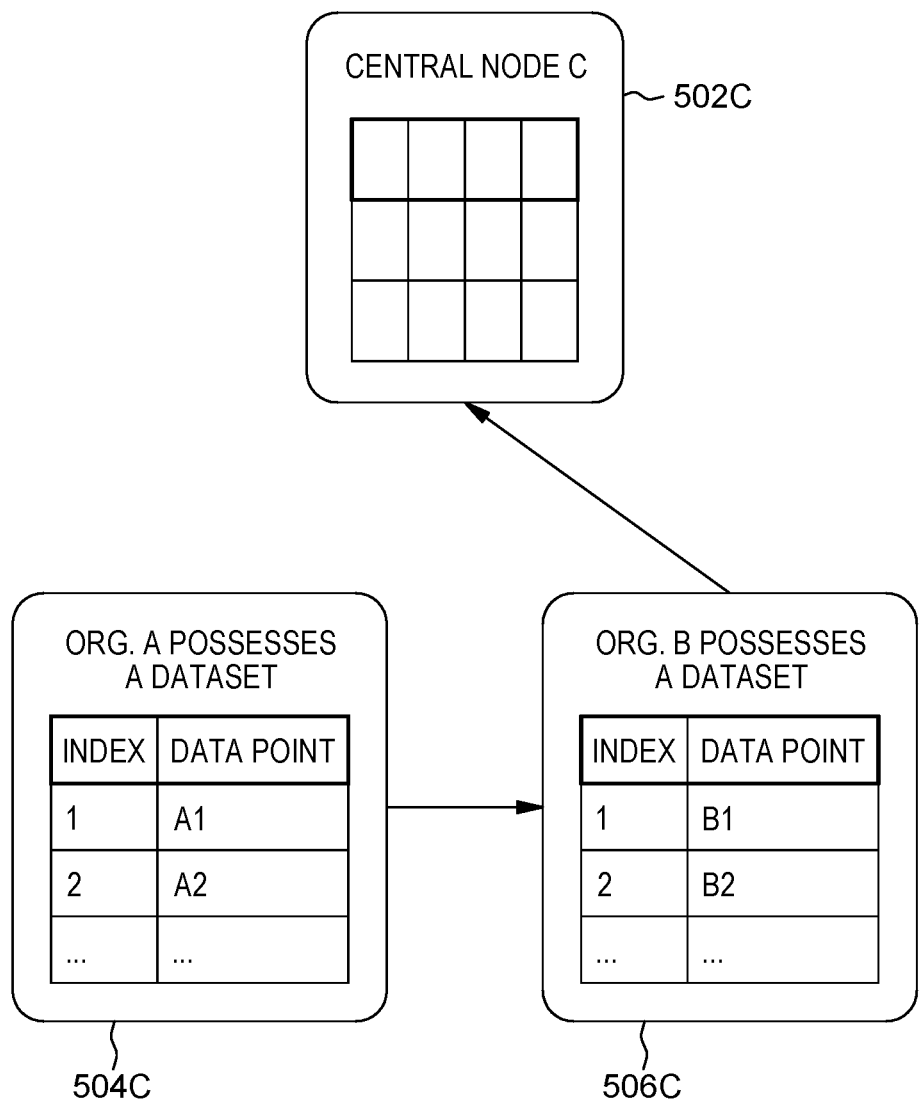
FIG. 5C is a block diagram view of a second stage of establishing privacy preserving global data relationships according to a second embodiment of the present invention.

Diagram 500C of FIG. 5C shows a block diagram illustrating a second stage of establishing a global relation between datasets of a multi-organization data distribution while preserving data privacy between organizations (and/or data parties and/or entities) according to an embodiment of the present invention, including the following: (i) central node C 502C, a central node controlled by organization C; (ii) organization A dataset 504C, a dataset controlled by organization A; and (iii) organization B dataset 506C, a dataset controlled by organization B. At this second stage, referred to as Stage_2(B, C), describes communication between Organization B dataset 506C and central node C 502C. First, organization B computes a correlation function F(dataA_publicA, dataB_publicA) describing a global relationship between dataA and dataB using homomorphic encryption. This is possible because both dataA and dataB are encrypted with the same key—publicA. Organization B sends F(dataA_publicA, dataB_publicA) to central node C 502C. Central node C 502C receives F(dataA_publicA, dataB_publicA) and adds a random noise value R (encrypted by the publicA key) to this function which results in F(dataA_publicA, dataB_publicA)+R_publicA. Note that organization C does not have the key privateA which is necessary to decrypt anything encrypted by publicA, and is therefore effectively unable to discern the values for dataA and dataB.

Figure 5D:
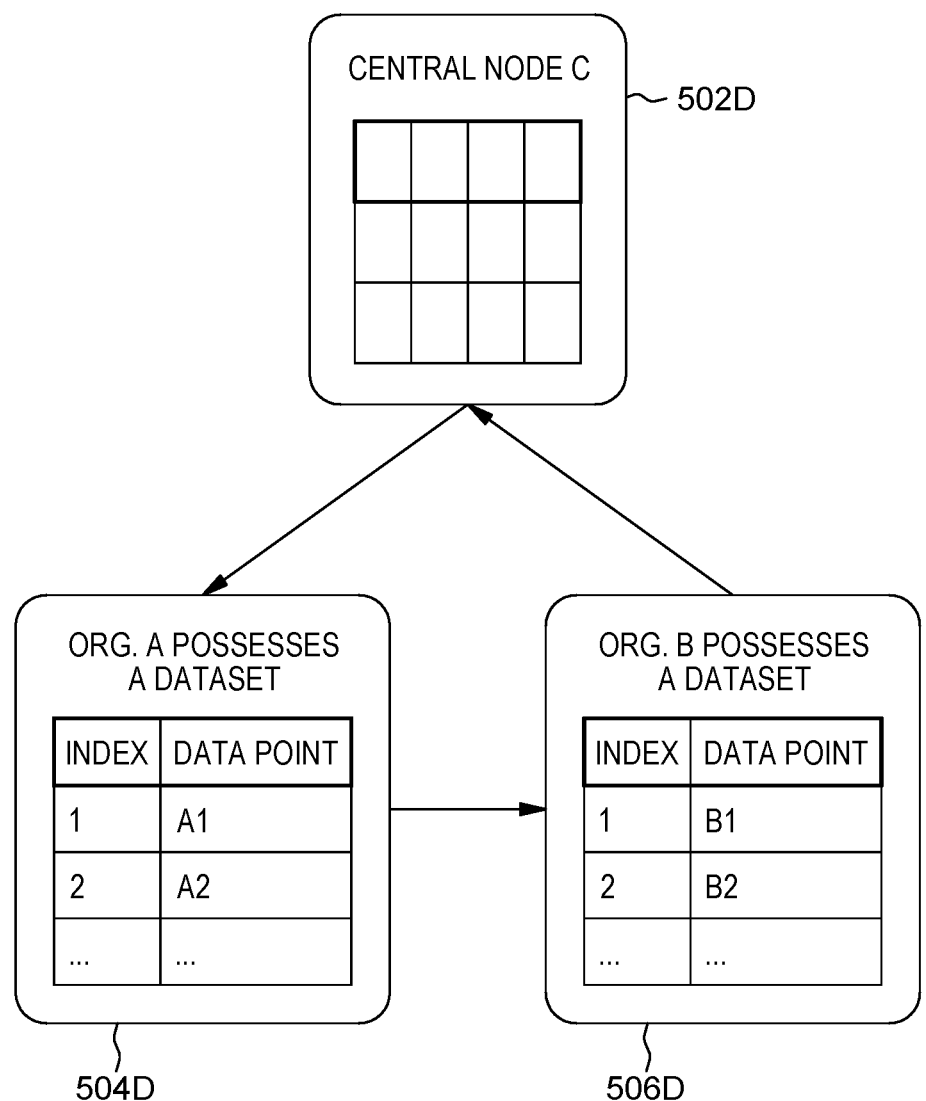
FIG. 5D is a block diagram view of a third stage of establishing privacy preserving global data relationships according to a second embodiment of the present invention.

Diagram 500D of FIG. 5D shows a block diagram illustrating a third stage of establishing a global relation between datasets of a multi-organization data distribution while preserving data privacy between organizations (and/or data parties and/or entities) according to an embodiment of the present invention, including the following: (i) central node C 502D, a central node controlled by organization C; (ii) organization A dataset 504D, a dataset controlled by organization A; and (iii) organization B dataset 506D, a dataset controlled by organization B. At this third stage, referred to as Stage_3(C,A), describes communication between central node C 502D and organization A dataset 506D. Central node C 502D sends F(dataA_publicA, dataB_publicA)+R_publicA to organization A. Organization A receives F(dataA_publicA, dataB_publicA)+R_publicA, uses its private key privateA to decrypt F(dataA_publicA, dataB_publicA)+R_publicA and sends the resulting decrypted function (with the previously added noise) F(dataA, dataB)+R back to central node C 502D. Note that, organization A cannot effectively speculate on the value of dataB because of the unknown random R. Central node C 502D receives F(dataA, dataB)+R, and then subtracts R to yield F(dataA, dataB), which describes the relationship between dataA and dataB without actually describing the values for either dataA or dataB individually. In the end, of dataA, dataB, and the relationship between the two F(dataA, dataB), each organization only has one piece of the whole. Organization A knows dataA, but not dataB or F(dataA, dataB) because of the random noise R added by organization C to F(dataA_publicA, dataB_publicA). Organization A does not receive dataB independent of the relationship function with added noise. Organization B knows dataB but not dataA or the relationship F(dataA, dataB), as organization B does not have the private key privateA which is necessary to decrypt dataA_publicA. Organization C only has the relationship between dataA and dataB, as described above.

Figure 6:
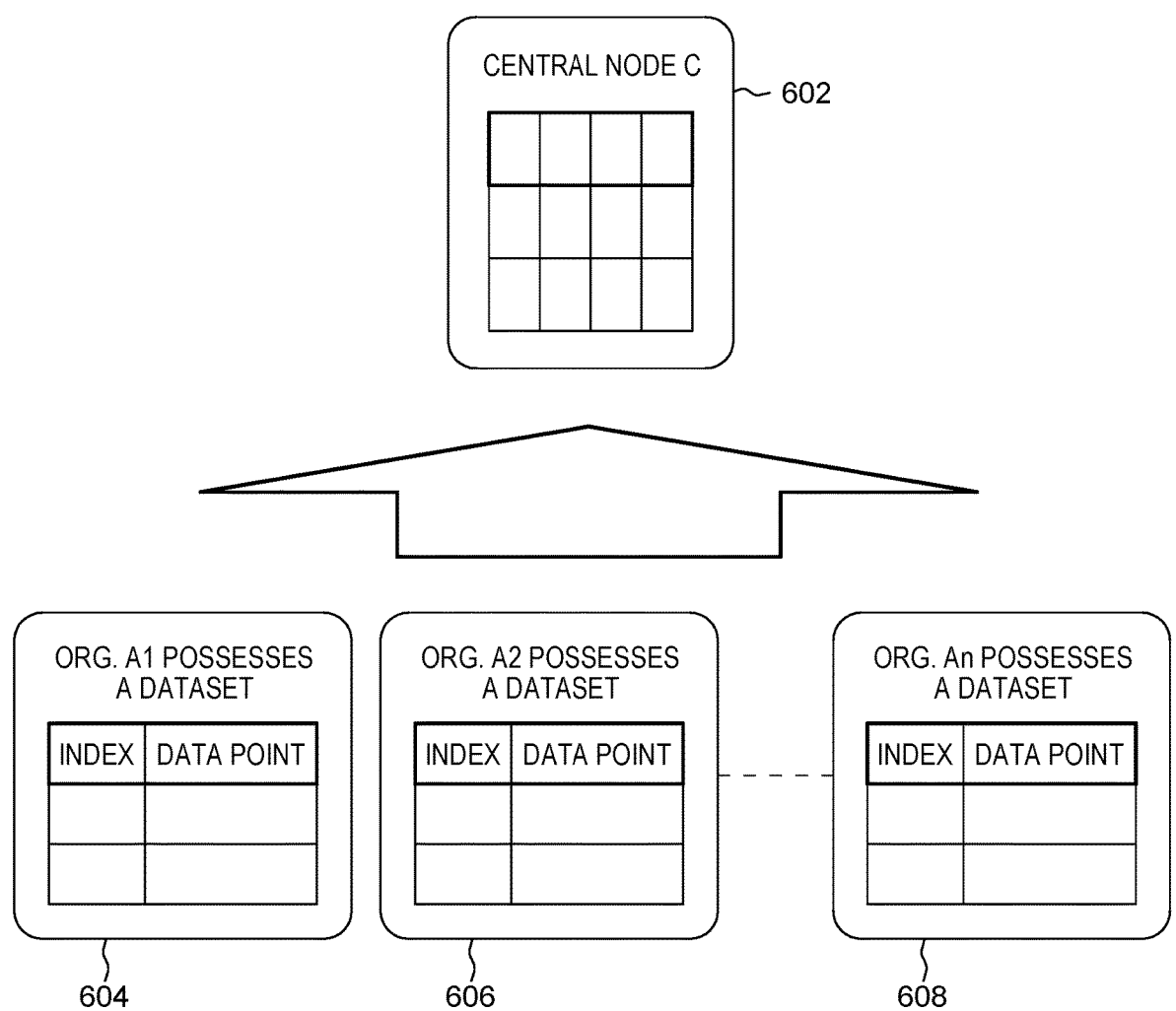
FIG. 6 is a block diagram view of a general scenario for application of the example stages illustrated in FIGS. 5B through 5D.

Diagram 600 of FIG. 6 describes a general scenario for application of the stages illustrated in FIGS. 5B through 5D. Diagram 600 includes: (i) central node C 602; (ii) organization A1 dataset 604; (iii) organization A2 dataset 606; and (iv) organization An dataset 608. Assuming there are n data parties A1, A2, . . . , An and a central party C, in order to compute the relation table of those data parties and store it in central node C 602, For each Ai and Aj, call Stage_1(Ai, Aj) (such as shown in FIG. 5B), Stage_2(Aj, C) (such as shown in FIG. 5C) and Stage_3(C, Ai) (such as shown in FIG. 5D), in that order. For example, Ai may correspond to organization A1 dataset 604 and Aj may correspond to organization A2 dataset 606. If the relation function is not symmetric, then repeat Stage_1 through Stage_3 while exchanging the role of Ai and Aj (or now Stage_1(Aj, Ai). The computation for each pair of data parties Ai and Aj can be done in parallel.

Some embodiments of the present invention may include one, or more, of the following operations, features, characteristics and/or advantages: (i) a protocol that enables the computation of a global relationship on distributed data sets in a federated/distributed, precise and privacy-preserved way; (ii) the protocol allows the involvement of many data parties and a third party in the computation; (iii) data parties keep their own data and do not share their data with any party; (iv) the third party keeps the computation result and does not share it with any party; (v) data parties and the third party handshake (for example, such as in the steps described in FIGS. 6 through 9); (vi) the protocol supports the computation of functions that are designed to extract statistical properties of uniform datasets belonging to multiple entities participating to a federated setting; (vii) example functions include, but not limited to: (a) correlation functions (Pearson, Spearman, etc.), and (b) similarity functions (cosine, euclidian, etc.); (viii) a system that uses the protocol to enable the computation of a global relationship on distributed data sets in a federated/distributed, precise and privacy-preserved way; (ix) system includes the following components: (a) one (or more for scalability) server components representing the third party, and (b) n client components representing n data parties; (x) system takes as inputs: (a) distributed data, and (b) one or more relation functions, which can be symmetric or asymmetric; (xi) the system computes the global relationship using the protocol; (xii) the system produces as output: one or more global relationship tables, each corresponding to one relation function; (xiii) the system further comprised of functions that enable ones to use the computed relationships for: (a) data analytics, (b) visualization, (c) data poisoning defense, and (d) data value estimation; and (xiv) the system further comprised of systems and methods to deploy the system in cloud-based environments as a service.

Some embodiments of the present invention may include one, or more, of the following operations, features, characteristics and/or advantages: (i) a system and method to enable the computation of a global relationship on distributed data sets in a federated/distributed and privacy-preserved way; (ii) system includes the following components: (a) one (or more for scalability) server components representing the central party, and (b) n client components representing n data parties; (iii) system takes as inputs: (a) distributed data, and (b) one or more relation functions, which can be symmetric or asymmetric; (iv) the system computes the global relationship in a federated/distributed and privacy-preserved way; (v) the system produces as output one or more global relationship tables, each corresponding to one relation function; (vi) the further comprised of functions that enable ones to use the computed relationships for: (a) data analytics, (b) visualization, (c) data poisoning defense, and (d) data value estimation; (vii) the system further comprised of systems and methods to deploy the system in cloud-based environments as a service; (viii) the functions of the system and method are functions designed to extract statistical properties of the uniform dataset belonging to the multiple entities participating to the federated setting.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

We: this document may use the word "we," and this should be generally be understood, in most instances, as a pronoun style usage representing "machine logic of a computer system," or the like; for example, "we processed the data" should be understood, unless context indicates otherwise, as "machine logic of a computer system processed the data"; unless context affirmatively indicates otherwise, "we," as used herein, is typically not a reference to any specific human individuals or, indeed, and human individuals at all (but rather a computer system).

What is claimed is:

1. A computer-implemented method (CIM) for use with at least two datasets, including a first dataset and a second dataset, respectively controlled by a first data party and a second data party, the CIM comprising:

receiving a public key of a public-private key pair from the first data party corresponding to the public key used by the first data party to encrypt the first dataset and the second party to encrypt the second dataset;

receiving an encrypted relationship function output value corresponding to a relationship between the first dataset encrypted with the public key and the second dataset encrypted with the public key;

generating a noisy encrypted relationship function output value by supplementing the encrypted relationship function output value with a random noise value encrypted with the public key;

receiving an encrypted asymmetrical relationship function output value corresponding to a relationship between the second dataset encrypted with a second public key and the first dataset encrypted with the second public key; and generating a noisy encrypted asymmetrical relationship function output value by supplementing the encrypted asymmetrical relationship function output value with a second random noise value encrypted with the second public key.

2. The CIM of claim 1, further comprising:
sending the noisy encrypted relationship function output value to the first data party for decryption using the private key.

3. The CIM of claim 2, further comprising:
receiving a noisy relationship function output value corresponding to the noisy encrypted relationship function output value decrypted by the private key; and
extracting the random noise value to yield a relationship function output value.

4. The CIM of claim 3, further comprising:
generating a global relationship table based on the relationship function output value.

5. The CIM of claim 3, further comprising:
receiving a second public key of a second public-private key pair from the second data party corresponding to the second public key used by the second data party to encrypt the second dataset and the first party to encrypt the first dataset;
sending the noisy encrypted asymmetrical relationship function output value to the second data party for decryption using the second private key; and
extracting the second random noise value to yield the asymmetrical relationship function output value;
wherein the relationship function is asymmetrical.

6. The CIM of claim 1, wherein the encrypted relationship function output value is generated using homomorphic encryption.

7. A computer program product (CPP) for use with at least two datasets, including a first dataset and a second dataset, respectively controlled by a first data party and a second data party, the CPP comprising:
a machine readable storage device; and
computer code stored on the machine readable storage device, with the computer code including instructions for causing a processor(s) set to perform operations including the following:
receiving a public key of a public-private key pair from the first data party corresponding to the public key used by the first data party to encrypt the first dataset and the second party to encrypt the second dataset;
receiving an encrypted relationship function output value corresponding to a relationship between the first dataset encrypted with the public key and the second dataset encrypted with the public key;
generating a noisy encrypted relationship function output value by supplementing the encrypted relationship function output value with a random noise value encrypted with the public key;
receiving an encrypted asymmetrical relationship function output value corresponding to a relationship between the second dataset encrypted with a second public key and the first dataset encrypted with the second public key; and
generating a noisy encrypted asymmetrical relationship function output value by supplementing the encrypted asymmetrical relationship function output value with a second random noise value encrypted with the second public key.

8. The CPP of claim 7, wherein the computer code further includes instructions for causing the processor(s) set to perform the following operations:
sending the noisy encrypted relationship function output value to the first data party for decryption using the private key.

9. The CPP of claim 8, wherein the computer code further includes instructions for causing the processor(s) set to perform the following operations:
receiving a noisy relationship function output value corresponding to the noisy encrypted relationship function output value decrypted by the private key; and
extracting the random noise value to yield a relationship function output value.

10. The CPP of claim 9, wherein the computer code further includes instructions for causing the processor(s) set to perform the following operations:
generating a global relationship table based on the relationship function output value.

11. The CPP of claim 9, wherein the computer code further includes instructions for causing the processor(s) set to perform the following operations:
receiving a second public key of a second public-private key pair from the second data party corresponding to the second public key used by the second data party to encrypt the second dataset and the first party to encrypt the first dataset;
sending the noisy encrypted asymmetrical relationship function output value to the second data party for decryption using the second private key; and
extracting the second random noise value to yield the asymmetrical relationship function output value;
wherein the relationship function is asymmetrical.

12. The CPP of claim 7, wherein the encrypted relationship function output value is generated using homomorphic encryption.

13. A computer system (CS) for use with at least two datasets, including a first dataset and a second dataset, respectively controlled by a first data party and a second data party, the CS comprising:
a processor(s) set;
a machine readable storage device; and
computer code stored on the machine readable storage device, with the computer code including instructions for causing the processor(s) set to perform operations including the following:
receiving a public key of a public-private key pair from the first data party corresponding to the public key used by the first data party to encrypt the first dataset and the second party to encrypt the second dataset;
receiving an encrypted relationship function output value corresponding to a relationship between the first dataset encrypted with the public key and the second dataset encrypted with the public key;
generating a noisy encrypted relationship function output value by supplementing the encrypted relationship function output value with a random noise value encrypted with the public key;
receiving an encrypted asymmetrical relationship function output value corresponding to a relationship between the second dataset encrypted with a second public key and the first dataset encrypted with the second public key; and
generating a noisy encrypted asymmetrical relationship function output value by supplementing the encrypted asymmetrical relationship function output value with a second random noise value encrypted with the second public key.

14. The CS of claim 13, wherein the computer code further includes instructions for causing the processor(s) set to perform the following operations:

sending the noisy encrypted relationship function output value to the first data party for decryption using the private key.

15. The CS of claim 14, wherein the computer code further includes instructions for causing the processor(s) set to perform the following operations:

receiving a noisy relationship function output value corresponding to the noisy encrypted relationship function output value decrypted by the private key; and extracting the random noise value to yield a relationship function output value.

16. The CS of claim 15, wherein the computer code further includes instructions for causing the processor(s) set to perform the following operations:

generating a global relationship table based on the relationship function output value.

17. The CS of claim 15, wherein the computer code further includes instructions for causing the processor(s) set to perform the following operations:

receiving a second public key of a second public-private key pair from the second data party corresponding to the second public key used by the second data party to encrypt the second dataset and the first party to encrypt the first dataset;

sending the noisy encrypted asymmetrical relationship function output value to the second data party for decryption using the second private key; and extracting the second random noise value to yield the asymmetrical relationship function output value;

wherein the relationship function is asymmetrical.

18. The CS of claim 13, wherein the encrypted relationship function output value is generated using homomorphic encryption.

* * * * *